United States Patent
Rao et al.

(10) Patent No.: US 10,937,118 B2
(45) Date of Patent: *Mar. 2, 2021

(54) SCHEDULING AND DISPATCH OF GPGPU WORKLOADS

(71) Applicant: Intel Corporation, Santa Clara, CA (US)

(72) Inventors: Jayanth N. Rao, Folsom, CA (US); Michal Mrozek, Tczew (PL)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/260,031

(22) Filed: Jan. 28, 2019

(65) Prior Publication Data

US 2019/0259129 A1 Aug. 22, 2019

Related U.S. Application Data

(63) Continuation of application No. 14/142,681, filed on Dec. 27, 2013, now Pat. No. 10,235,732.

(51) Int. Cl.
*G06T 1/20* (2006.01)
*G06F 9/50* (2006.01)

(52) U.S. Cl.
CPC .............. *G06T 1/20* (2013.01); *G06F 9/5027* (2013.01); *G06F 2209/506* (2013.01)

(58) Field of Classification Search
CPC .... G06T 1/20; G06F 9/5027; G06F 2209/506
See application file for complete search history.

(56) References Cited

U.S. PATENT DOCUMENTS

| | | | | |
|---|---|---|---|---|
| 7,877,585 | B1* | 1/2011 | Coon | G06F 9/30072 712/233 |
| 9,009,711 | B2* | 4/2015 | Wein | G06F 9/546 718/102 |
| 9,015,683 | B2 | 4/2015 | Cho et al. | |
| 2010/0218196 | A1* | 8/2010 | Leung | G06F 8/453 718/107 |
| 2011/0161976 | A1* | 6/2011 | Alexander | G06F 9/52 718/104 |
| 2012/0117008 | A1 | 5/2012 | Xu et al. | |
| 2012/0180072 | A1 | 7/2012 | Sander et al. | |
| 2013/0160016 | A1* | 6/2013 | Gummaraju | G06F 9/5044 718/102 |
| 2013/0241941 | A1 | 9/2013 | Donaldson et al. | |
| 2013/0332937 | A1* | 12/2013 | Gaster | G06F 9/50 718/104 |
| 2014/0089935 | A1 | 3/2014 | Takano | |
| 2014/0123150 | A1 | 5/2014 | Lindholm et al. | |
| 2015/0022538 | A1* | 1/2015 | Munshi | G06F 9/5027 345/522 |

* cited by examiner

*Primary Examiner* — Michael Le
(74) *Attorney, Agent, or Firm* — Jaffery Watson Mendonsa & Hamilton LLP

(57) ABSTRACT

A method and system are described herein for an optimization technique on two aspects of thread scheduling and dispatch when the driver is allowed to pick the scheduling attributes. The present techniques rely on an enhanced GPGPU Walker hardware command and one dimensional local identification generation to maximize thread residency.

24 Claims, 7 Drawing Sheets

300

600

SCHEDULING AND DISPATCH OF GPGPU WORKLOADS

CLAIM TO PRIORITY

This Application is a continuation of U.S. application Ser. No. 14/142,681, entitled SCHEDULING AND DISPATCH OF GPGPU WORKLOADS, by Jayanth N. Rao, et al., filed Dec. 27, 2013, the entire contents of which are incorporated herein by reference.

BACKGROUND ART

Computing systems may include a graphics processing unit (GPU). The GPU is generally specialized for processing graphics workloads that benefit from processing large blocks of data in parallel, and may be single instruction multiple data (SIMD) based. A GPU thread from the graphics workload may be scheduled to process each data element, such as a pixel. In some cases, each thread may process multiple pixels when executed by a SIMD-based execution unit. In some cases, an execution unit of the GPU can have a processing width of four, eight, sixteen, or thirty-two bits. The graphics workload processed by such a GPU may not use the entire processing width of the execution unit, which can result in under-utilization of the GPU.

BRIEF DESCRIPTION OF THE DRAWINGS

The following detailed description may be better understood by referencing the accompanying drawings, which contain specific examples of numerous features of the disclosed subject matter.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
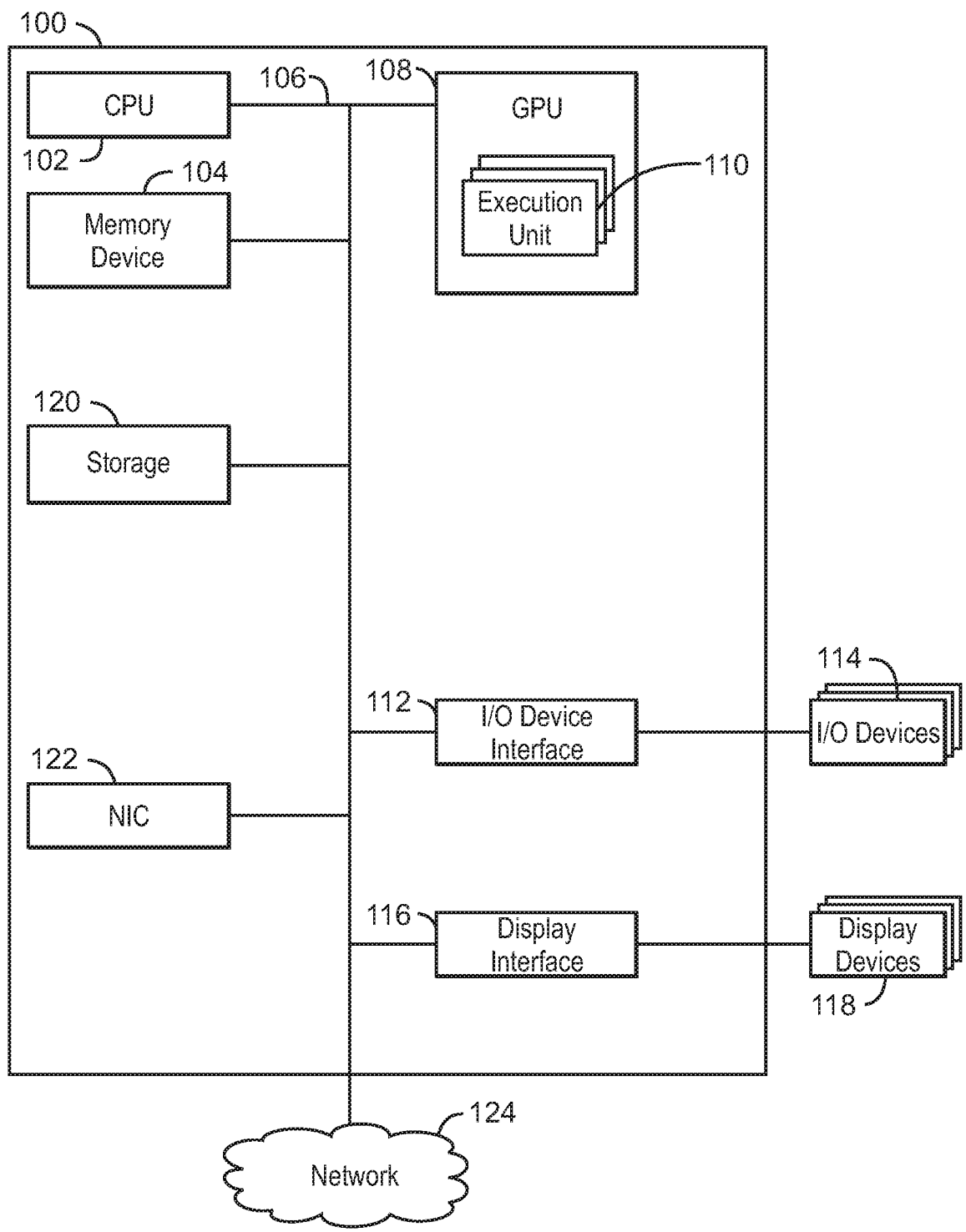
FIG. 1 is a block diagram of a computing device that may be used to schedule and dispatch GPGPU workloads.

A number of threads may be organized into groups and processed by an execution unit. In some cases, the execution unit is implemented using a SIMD-based architecture. The threads may not use the entire width of the execution unit. In some cases, when the threads do not use the entire width of the execution unit, the threads may not align with the GPU. In some cases, a GPU thread may be referred to as a work item when using a computing language such as the Open Computing Language (OpenCL). Each work item may be grouped into a working set, which may be referred to as a local work group. A number of local work groups can form the total work space, which may be referred to as a global work group. Although the present techniques may be described using terminology from a computing language such as OpenCL, the present techniques apply to the scheduling and dispatch of workloads using any language.

Embodiments described herein relate to the scheduling and dispatch of general purpose graphics processing unit (GPGPU) workloads. In particular, a local work size for the threads from a GPGPU workload may be computed. The threads may then be split using a GPU walker command. In some cases, a driver may select scheduling attributes by selecting aspects of thread scheduling and dispatch. Additionally, in some cases, a GPGPU walker hardware command may be used to dispatch an appropriate number of threads.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of a computing device 100 that may be used to schedule and dispatch GPGPU workloads. The computing device 100 may be, for example, a laptop computer, desktop computer, ultrabook, tablet computer, mobile device, or server, among others. The computing device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the computing device 100 may include more than one CPU 102. The memory device 104 can include random access memory (RAM), read only memory (ROM), flash memory, or any other suitable memory systems. For example, the memory device 104 may include dynamic random access memory (DRAM).

The computing device 100 may also include a graphics processing unit (GPU) 108. As shown, the CPU 102 may be coupled through the bus 106 to the GPU 108. The GPU 108 may be configured to perform any number of graphics operations within the computing device 100. For example, the GPU 108 may be configured to render or manipulate graphics images, graphics frames, videos, or the like, to be displayed to a user of the computing device 100. The GPU 108 includes a plurality of execution units 110. The executions units 110 may process threads or work items from any number of graphics workloads.

Typical graphics workloads result in millions of threads, which are processed by the GPU. Each thread contains work items, and each thread can have a specific width which indicates how many work items run under the threads. The global work group includes a number of local work groups, and work items within a local work group are executed a synchronous manner. In some cases, the work items within a local work group are executed in a synchronous manner using software defined synchronization points of execution. The work items within a local work group also share data through shared local memory. A GPGPU walker command provides support for spawning a large number of GPU threads. Drivers may be used to implement the GPGPU walker command using GPU hardware.

The CPU 102 may also be connected through the bus 106 to an input/output (I/O) device interface 112 configured to connect the computing device 100 to one or more I/O devices 114. The I/O devices 114 may include, for example, a keyboard and a pointing device, wherein the pointing device may include a touchpad or a touchscreen, among others. The I/O devices 114 may be built-in components of the computing device 100, or may be devices that are externally connected to the computing device 100.

The CPU 102 may be linked through the bus 106 to a display interface 116 configured to connect the computing device 100 to a display device 118. The display device 118 may include a display screen that is a built-in component of the computing device 100. The display device 118 may also include a computer monitor, television, or projector, among others, that is externally connected to the computing device 100.

The computing device also includes a storage device 120. The storage device 120 is a physical memory such as a hard drive, an optical drive, a thumbdrive, an array of drives, or any combinations thereof. The storage device 120 may also include remote storage drives. The computing device 100 may also include a network interface controller (NIC) 122 may be configured to connect the computing device 100 through the bus 106 to a network 124. The network 124 may be a wide area network (WAN), local area network (LAN), or the Internet, among others.

The block diagram of FIG. 1 is not intended to indicate that the computing device 100 is to include all of the components shown in FIG. 1. Rather, the computing system 100 can include fewer or additional components not illustrated in FIG. 1 (e.g., sensors, power management integrated circuits, additional network interfaces, etc.). The computing device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

Graphics workloads, such as those in OpenCL, operate with local work group sizes that are a multiple of the global work group size. Put another way, the local workgroup size must divide evenly within the global work group size. The local and global work size can be specified by an OpenCL application. However, the OpenCL application may choose to leave the local work group size assignment to a driver as well. This allows the driver to optimize the local work size to the hardware architecture for optimal performance. However, some workloads do not align with the SIMD-based processors, and may be further analyzed to execute in a more efficient manner using SIMD-based processors. For example, a high definition media graphics workload typical includes data sets of 1920×1080. Such a data set may note align with SIMD-based processors that typically have a processing widths of eight, sixteen and thirty-two bytes.

Figure 2:
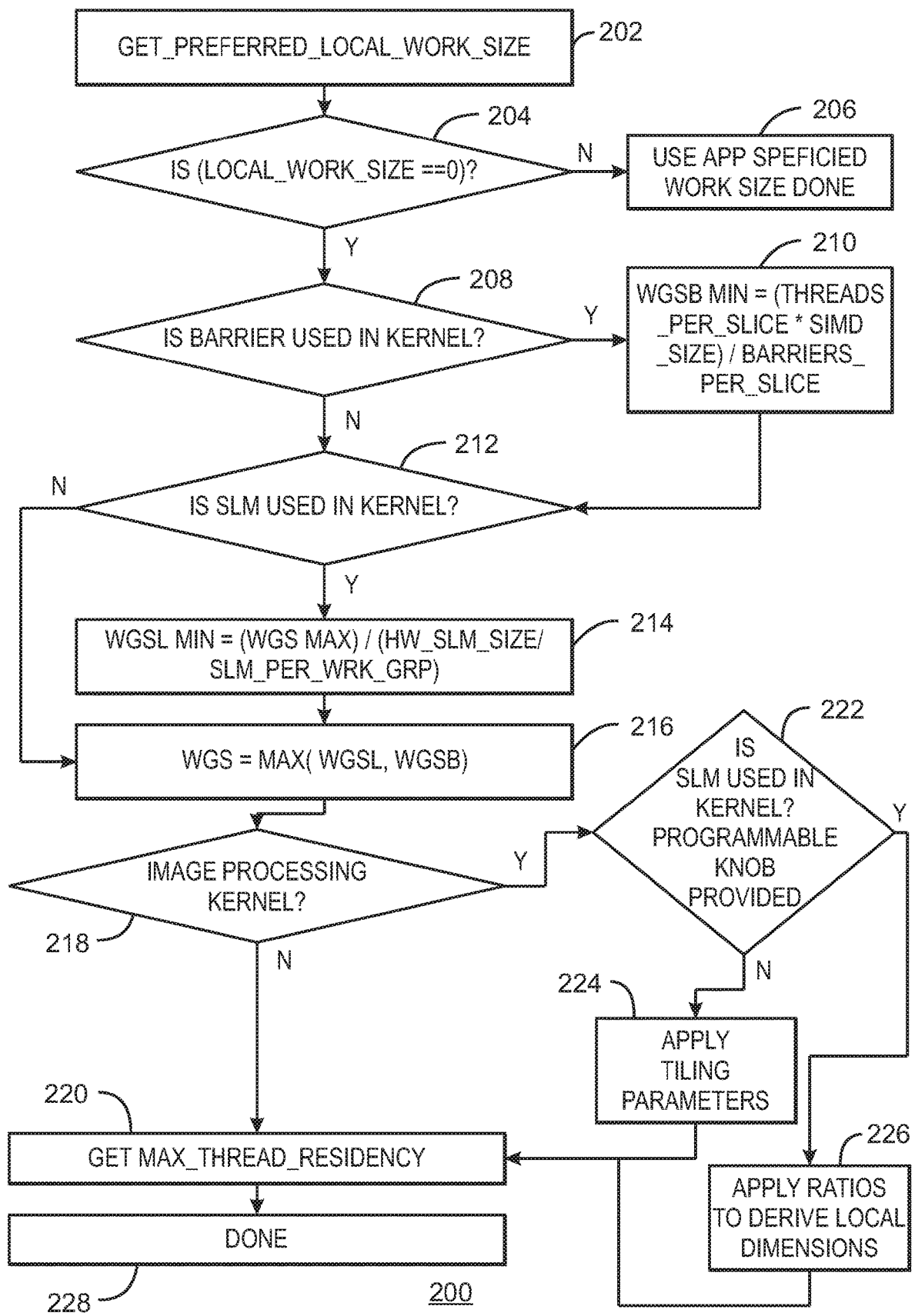
FIG. 2 is a flow diagram for computing a local work group size.

FIG. 2 is a flow diagram for computing a local work group size. At block 202, a preferred local work group size is selected. The preferred local work group size may be specified by an application. In some examples, the application is any OpenCL application that leaves the local work group size as null and uses the driver for a workgroup size selection. At block 204, it is determined if the local work group size is equal to zero. If the local work group size is not equal to zero, process flow continues to block 206. If the local work group size is equal to zero, process flow continues to block 208. An algorithm may be used to determine a local work group size that maximizes GPU scheduling and execution performance. The algorithm will pick the optimal sizes along three dimensions, such that a minimum number of SIMD channels are wasted and the SIMD channel residency is high. Thus, the application can create its own representation of the problem using up to three dimensions. For example, in a 2D image, the global domain is represented as a 2D surface of points with sizes equal to the image width for a first dimension and image height for a second dimension. It is the decision of an application developer as to how the dimensions are created. The algorithm will see how many dimensions are necessary, then act accordingly. In this manner, the maximum available compute resources are applied to process the submitted workload. The number of wasted SIMD channels may be computed as follows (get max thread residency):

$$WGS_{num} = \frac{GS[0]*GS[1]*GS[2]}{LS[0]*LS[1]*LS[2]}$$

$$Waste_{wkg} = SIMD_{size} - \frac{LS[0]*LS[1]*LS[2]+SIMD_{size}-1}{SIMD_{size}}$$

$$Waste_{wkg} = SIMD_{size} - ((LS[0]*LS[1]*LS[2]-1) \& (SIMD_{size}-1))$$

$$Waste_{total} = WGS_{num} * Waste_{wkg}$$

where $WGS_{num}$ is the total number of local workgroups for the entire job; GS[0], GS[1], GS[2] are the global sizes for the given dimension; LS[0], LS[1], LS[2] are the local sizes for the given dimension; $Waste_{wkg}$ is the wasted SIMD channels for one local work group; and $Waste_{total}$ is the total number of wasted channels for the entire job. Local work group sizes set with lowest value of $Waste_{total}$ are selected. At block 206, the application specified local work group size is used.

At block 208, it is determined if a barrier is used in the kernel. If a barrier is used in the kernel, process flow continues to block 210. If a barrier is not used in the kernel, process flow continues to block 212. At block 210, the total number of workloads with barriers for the entire workload is determined, and process flow continues to block 212. In some cases, barriers are hardware entities that synchronize threads within a local work group. The number of barriers may vary across different computing systems. In examples, a GPU may include sixteen hardware barriers.

In some examples, each execution unit may include sixteen channels or lanes. The width of the processor may refer to the number of channels within each execution unit. Each channel includes a minimum amount of hardware that is used to process a data element, such as at least one arithmetic and logical unit (ALU) and at least one register. A local work group may be processed using several execution units, and a barrier may be used to synchronize processing local work group across multiple execution units. In the event there are not enough barriers to synchronize the processing of each local work group within the global work group, the scheduler will stall dispatching new threads until there is enough available resource. As a result, a local work group size is selected so that all channels of an execution unit are used, and a minimum number of barriers are used. The local work group size selected is above a minimal work group size that is later computed. This reduces the potential for thread stalls and can improve performance.

Specifically, the number of work groups available based on the number of barriers within the computing system $WGSB_{min}$ may be computed as:

$$WGSB_{min} = \frac{Threads\_per\_slice * SIMD\_size}{Barriers\_per\_slice}$$

where Threads_per_slice is the maximum number of hardware threads per slice. The Threads_per_slice depends on the platform and the GPU; SIMD_size is the compiled kernel SIMD size, which is typically eight, sixteen, or thirty-two; and Barriers_per_slices is the number of hardware barriers. Typically, as discussed above, the number of hardware barriers is sixteen.

At block 212, it is determined if shared local memory is used in the kernel. If shared local memory is used in the kernel, process flow continues to block 214. If shared local memory is not used in the kernel, process flow continues to block 216. At block 214, the shared local memory size for the each local work group is determined, and process flow continues to block 216. At block 216, the total number of local work groups for the workload is determined. The total number of local work groups is the maximum of the number of work groups with barriers and the number of work groups with shared local memory.

Shared local memory is memory that is common to a local workgroup. The shared local memory is managed in such a manner that if there is not enough shared local memory available, a scheduler will stall the dispatch of new threads until there is enough available shared local memory. An algorithm may be used to select a local work group size possible so that all execution unit slots are utilized, while maximizing the use of shared local memory. In this manner, the potential read stalls may be reduced and performance may be improved. The number of work groups based on the local memory size may be computed as:

$$WGSL_{min} = \frac{WGS_{max}}{HW\_slm\_size/SLM\_per\_wrk\_grp}$$

where $WGS_{max}$ is the maximum work group size supported by hardware per a sub-slice of the GPU; HW_slm_size is the hardware SLM size, which is typically 64 KB; and SLM_per_wrk_grp is the shared local memory required by the kernel for a particular workload.

At block 218, it is determined if the kernel is an image processing kernel. If the kernel is not an image processing kernel, process flow continues to block 220. If the kernel is an image processing kernel, process flow continues to block 222. At block 220, a maximum thread residency is computed. A maximum thread residency is a waste computation as discussed above (get max thread residency). Process flow is then ended at block 228.

At block 222, it is determined if shared local memory is used in the kernel. In some cases, a programmable knob is provided. If shared local memory is not used in the kernel, the memory is tiled. Process flow then continues to block 220. Image surfaces are typically tiled to improve the page hits of the DRAM memory. By tiling the memory, the memory may be accessed in a regular pattern instead of an irregular pattern that may result in page misses. In some cases, tiled memory arranges the layout of pixel data in memory in a manner such where pixels that are adjacent on the screen are also adjacent in memory. Since hardware samplers read pixels in a spatially rectangular fashion, tiling helps maximize page hits and improve the memory bandwidth.

Managing the dispatch attributes, can impact the memory access patterns of the kernels. Dispatch attributes may include, but are not limited to, the dimensions of the local work group size. By selecting a local work group size that is aligned to the size of the tiles in memory, page hits generated by kernel accesses are improved. Accordingly, tiling parameters may be applied, such as tiling dimensions that align with the local work group size. For example, an X tiled memory organization may have tiles of size 512×8 pixels, for a total of 4 KB, where the local work group size is 4 KB. In another example, a Y tiled memory organization may have tiles of size 128×32 pixels, for a total of 4 KB, with a local work group size of 4 KB. In other words, tiling specifies how image pixels are stored in the memory. If a memory page has 4 KB of space, if the memory is stored as X tiled, 512×8 pixels are stored for each page. If the memory is stored as Y tiled, 128×32 pixels are stored for each page on each page. Accordingly, a local work group with a total size of 4 KB can use various sized tiles to align the local work group size with the tiling dimensions. The work group size is computed by lws[0] *lws[1] *lws[2], and can be any value.

If shared local memory is used in the kernel, ratios are applied to derive local work group size dimensions at block 226. In some cases, image processing kernels may copy from global memory to local memory and process the local dataset within the local memory. The processing result is written back to global memory. Applying ratios such that the global memory size is a proportional to the local memory size, there is a performance gain. In some cases, the processing gain is similar to the processing gains achieved by tiling, as DRAM cache hits are more frequent with this technique.

The global ratio may be computed as follows:

$$Global_{ratio}=\ln X_{dim}-\ln Y_{dim}$$

where the $X_{dim}$ is . . . and the $Y_{dim}$ is . . . . Similarly, the local ratio may be computed as:

$$Local_{ratio}=\ln X_{dim}-\ln Y_{dim}$$

The ratio to be applied is the difference between the $Global_{ratio}$ and the $Local_{ratio}$:

$$Ratio_{diff}=|Global_{ratio}=Local_{ratio}|$$

In some cases, the maximum thread residency does not use an entire execution unit. For example, there is a global work space that has a size of 512×512 pixels. Accordingly, the global workspace is 512 for the $X_{dim}$ and 512 pixels for the $Y_{dim}$. The local work group size may have a size of 4×4 pixels. To completely process the global work space, enough threads are dispatched to process all of the 512×512 pixels. Specifically, the number of threads dispatched to run in parallel is dependent on the hardware and the number of hardware threads available.

In the case that the global work space is not proportional to the local work group size, some SIMD channels of the execution unit used for each local work group may not be utilized. Continuing with the pervious example, if the global work space had a size of 512×511 pixels, in the last dispatch of pixels to be processed a portion of the execution unit would not be utilized. In such a scenario, the dispatch of each local work group for processing may be split using several GPGPU walker commands.

Figure 3:
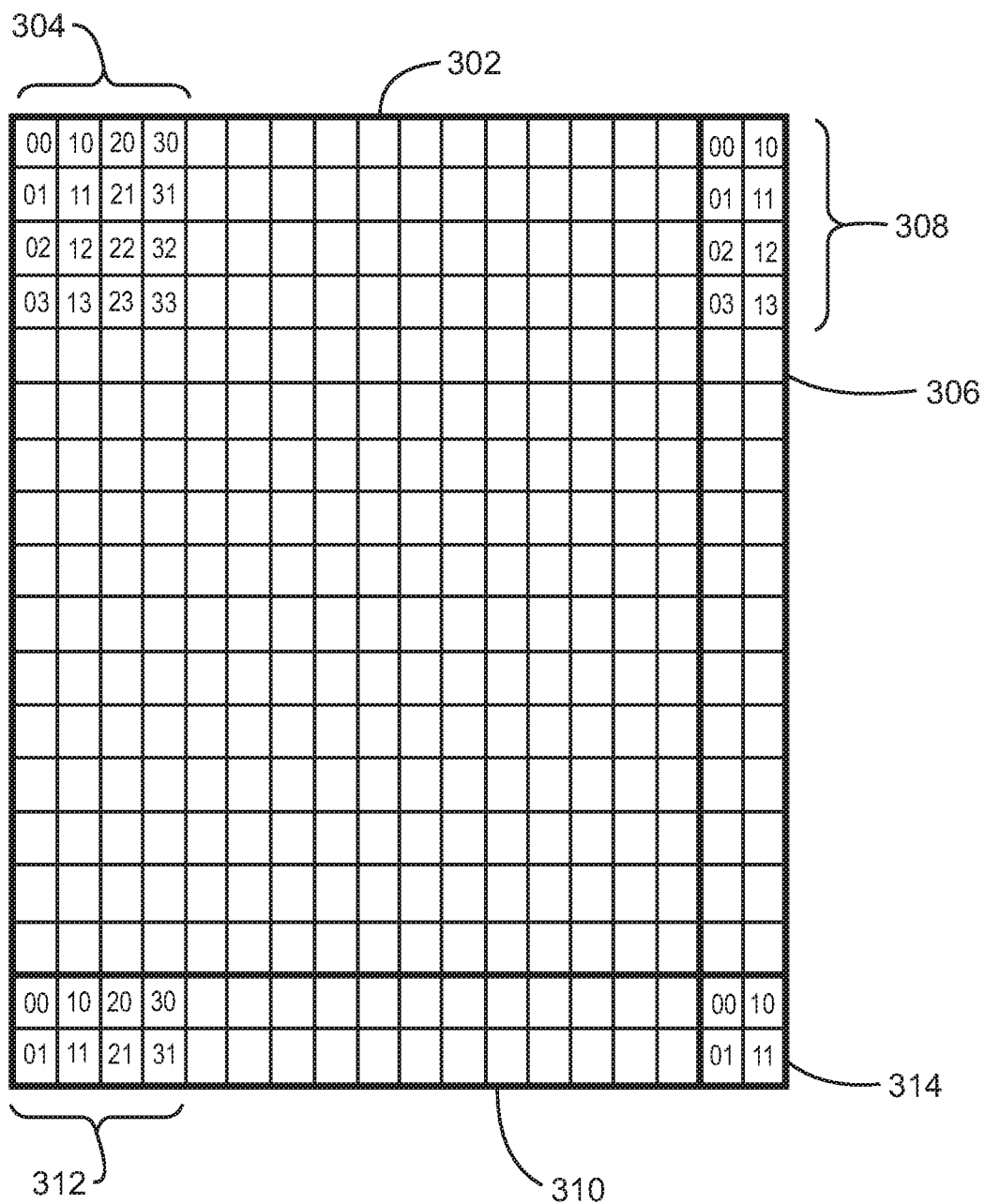
FIG. 3 is a work space split into four GPGPU walkers.

FIG. 3 is a work space 300 split into four GPGPU walkers. A GPGPU walker is a hardware command used to dispatch threads. In some cases, the GPGPU walker is implemented as a six level nested loop, where the innermost three levels correspond to a local work group size [3 dimensional-thread x, y, z count] and the outermost three levels correspond to the global work group size [3 dimensional—X, Y, Z]. A right and bottom mask is also available to mask channels within the local work group. The software uses only the x dimension for dispatch because this helps us maximize the thread residency. The loops of the GPGPU walker may be started at non-zero indices. Given that there is only mask [within the local worksize] and global work size can be prime numbered, there may be a high number of wasted channels if a single walker is dispatched for the global work space. A single walker for the global work space results in a very low SIMD channel residency. Accordingly, the GPGPU walker is split into multiple walkers, and the local work size is selected in such a manner that maximizes the SIMD channel residency. The local work size remains the same across all walkers.

A main walker is located at reference number 302. The main walker 302 has a full thread residency using a 4×4 local work size, as indicated at reference number 304. Each pixel in the local work size includes a local identification. Each 4×4 local work size can be processed using 16 SIMD channels, and no SIMD lanes are disabled. A right walker is located at reference number 306. The local work size remains 4×4 pixels, however only eight pixels are processed for each local work group. Each pixel within the local work group 308 includes a local identification. Each work group is dispatched to be executed on a 16 channel SIMD execution unit. This results in eight SIMD channels wasted for each local work group processed.

Similarly, a bottom walker 310 also has a local work group size of 4×4 pixels, and is dispatched to a 16 channel SIMD execution unit. However, the leftover local work group of eight pixels in the bottom walker 310 results in eight wasted SIMD channels. The work group 312 also includes a local identification. A bottom right walker 314 also uses the local work size of 4×4 pixels. When dispatched on a 16 channel SIMD execution unit, this results in 12 wasted SIMD channels. Each pixel in the bottom right walker includes a pixel identification.

Accordingly, the optimal local workgroup size may be obtained as described with respect to FIG. 2. Then, the GPGPU walkers may be used to iteratively find the nearest 'x' and 'y' that is lower or equal to global X and Y, and that are divisible by the local work group space. This ensures that the main walker has the maximum SIMD channel residency. Additionally, by choosing appropriate local work group sizes as a multiple of kernel SIMD sizes, the right and bottom edge walkers also have a maximum SIMD channel residency. The wasted channels are limited to the right-bottom corner walker.

For example, consider a two dimensional case 521×521, noting that 521 is a prime number. Since 521 is a prime number, there is one possible local work group size, which is 1×1. This results in 271,441 total work items. However, a GPGPU walker split can be done with a main walker using a local work group size of 16×16 pixels, with 32 work groups in the X & Y dimensions of the main walker. No SIMD channels are disabled, and 262,144 work items are processed. The number of work items processed by the main walker is 96.5% of the global work space. The right-edge walker also uses a local work group size 16×16 pixels, and has an execution work group size of 9×16 pixels, with 1 work group in X dimension. This work group is not full, as there are 9 work items to be done. However, there are 32 work groups in the Y dimension, which results in the local work groups being full in the Y dimension. As a result, no SIMD lanes are disabled, and 4608 work items are processed, which represents 1.6% of the global work space.

Continuing with the previous example, the bottom-edge walker uses the local work group size 16×16 pixels, and has an execution work group size 16×9 pixels, with 32 work groups in the X dimension and 1 work group in the Y dimension. Similar to the right-edge walker, no SIMD lanes disabled, and 4608 work items are processed, which is 1.6% of the global work space. The right-bottom edge walker uses the local work group size 16×16 pixels, and has an execution work group size of 9×9 pixels, with 1 work group in the X dimension that contains 9 work items to be processed. Additionally, there is 1 work group in the Y dimension that contains 9 work items to be processed. As a result, 15 SIMD lanes disabled for the last work item, and 81 work items are processed, which is 0.02% of the global work space. Execution performance gains are a result of the walker split because the wasted SIMD channels are minimized to the edge walkers. The main walker will have full SIMD channel residency for maximum performance.

Figure 4:
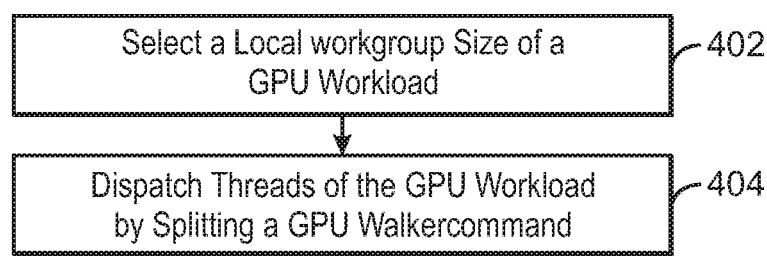
FIG. 4 is a process flow diagram for the scheduling and dispatch of GPU workloads.

FIG. 4 is a process flow diagram for the scheduling and dispatch of GPU workloads. At block 402, a local work group size may be selected. The work group may be selected as described with respect to FIG. 2. At block 404, threads of the GPU workload may be dispatched by a GPU walker command. The GPU walker command may dispatch threads as described with respect to FIG. 3.

Figure 5:
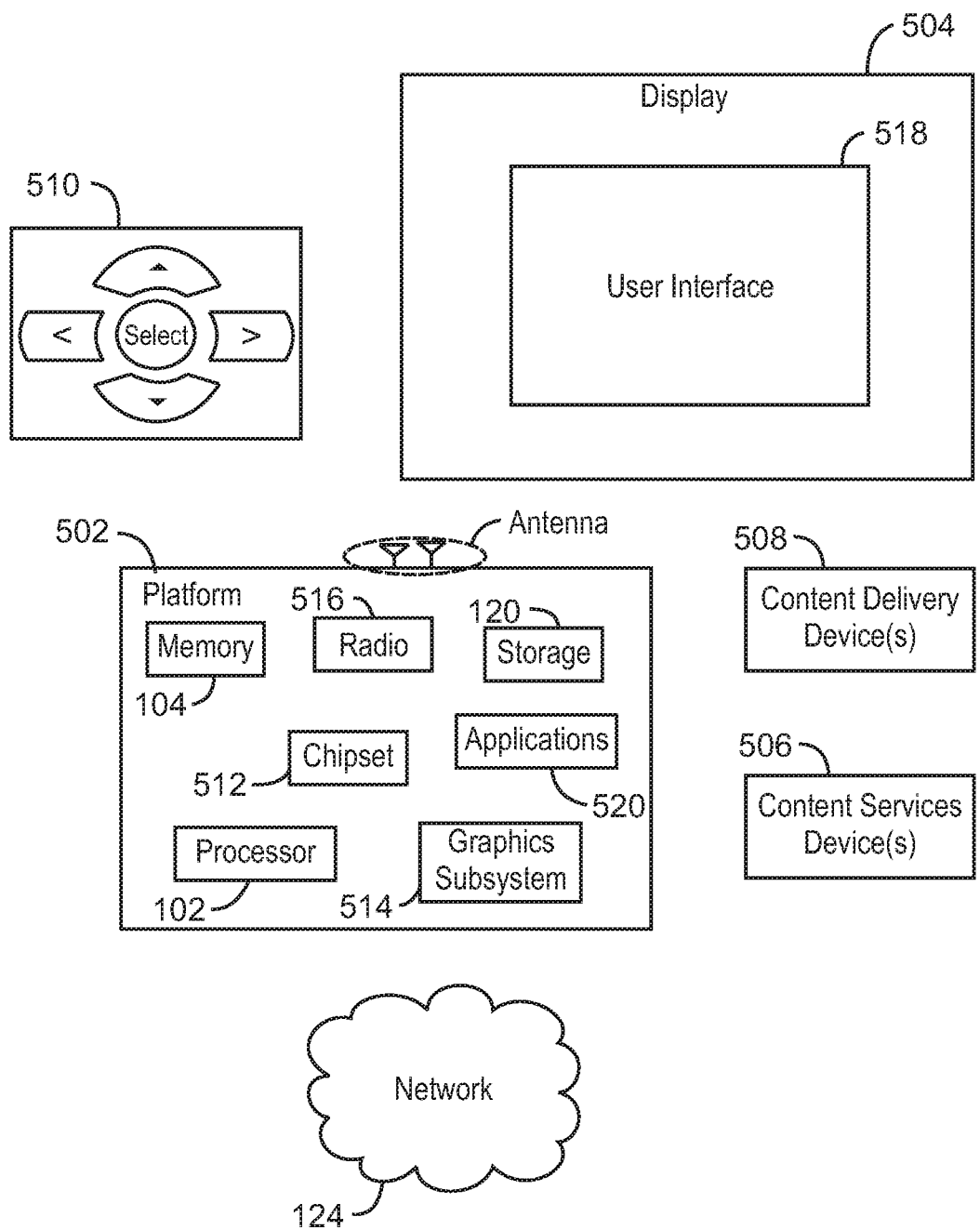
FIG. 5 is a block diagram of an exemplary system for scheduling and dispatching GPU workloads.

FIG. 5 is a block diagram of an exemplary system 500 for scheduling and dispatching GPU workloads. Like numbered items are as described with respect to FIG. 1. In some embodiments, the system 500 is a media system. In addition, the system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, or the like.

In various embodiments, the system 500 comprises a platform 502 coupled to a display 504. The platform 502 may receive content from a content device, such as content services device(s) 506 or content delivery device(s) 508, or other similar content sources. A navigation controller 510 including one or more navigation features may be used to interact with, for example, the platform 502 and/or the display 504. Each of these components is described in more detail below.

The platform 502 may include any combination of a chipset 512, an SIMD processing unit 102, a memory device 104, a storage device 126, a graphics subsystem 514, software 128, and a radio 516. The chipset 512 may provide intercommunication among the SIMD processing unit 102, the memory device 104, the storage device 126, the graphics subsystem 514, the software 128, and the radio 514. For example, the chipset 512 may include a storage adapter (not shown) capable of providing intercommunication with the storage device 126.

The SIMD processing unit 102 may be a standalone unit, or the SIMD processing unit 102 may be implemented as a component of a Complex Instruction Set Computer (CISC) or Reduced Instruction Set Computer (RISC) processors, x86 instruction set compatible processors, multi-core, or any other microprocessor or central processing unit (CPU). In some embodiments, the SIMD processing unit 102 is a component of dual-core processor(s), dual-core mobile processor(s), or the like.

The memory device 104 may be implemented as a volatile memory device such as, but not limited to, a Random Access Memory (RAM), Dynamic Random Access Memory (DRAM), or Static RAM (SRAM). The storage device 126 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, the storage device 126 includes technology to increase the storage performance enhanced protection for valuable digital media when multiple hard drives are included, for example.

The graphics subsystem 514 may perform processing of images such as still or video for display. An analog or digital interface may be used to communicatively couple the graphics subsystem 514 and the display 504. For example, the interface may be any of a High-Definition Multimedia Interface, DisplayPort, wireless HDMI, and/or wireless HD compliant techniques. The graphics subsystem 514 may be integrated into the SIMD processing unit 102 or the chipset 512. Alternatively, the graphics subsystem 514 may be a stand-alone card communicatively coupled to the chipset 512.

The graphics and/or video processing techniques described herein may be implemented in various hardware architectures. For example, graphics and/or video functionality may be integrated within the chipset 512. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 516 may include one or more radios capable of transmitting and receiving signals using various suitable wireless communications techniques. Such techniques may involve communications across one or more wireless networks. Exemplary wireless networks include wireless local area networks (WLANs), wireless personal area networks (WPANs), wireless metropolitan area network (WMANs), cellular networks, satellite networks, or the like. In communicating across such networks, the radio 516 may operate in accordance with one or more applicable standards in any version.

The display 504 may include any television type monitor or display. For example, the display 504 may include a computer display screen, touch screen display, video monitor, television, or the like. The display 504 may be digital and/or analog. In some embodiments, the display 504 is a holographic display. Also, the display 504 may be a transparent surface that may receive a visual projection. Such projections may convey various forms of information, images, objects, or the like. For example, such projections may be a visual overlay for a mobile augmented reality (MAR) application. Under the control of one or more software 128, the platform 502 may display a user interface 518 on the display 504.

The content services device(s) 506 may be hosted by any national, international, or independent service and, thus, may be accessible to the platform 502 via the Internet, for example. The content services device(s) 506 may be coupled to the platform 502 and/or to the display 504. The platform 502 and/or the content services device(s) 506 may be coupled to a network 130 to communicate (e.g., send and/or receive) media information to and from the network 130. The content delivery device(s) 508 also may be coupled to the platform 502 and/or to the display 504.

The content services device(s) 506 may include a cable television box, personal computer, network, telephone, or Internet-enabled device capable of delivering digital information. In addition, the content services device(s) 506 may include any other similar devices capable of unidirectionally or bidirectionally communicating content between content providers and the platform 502 or the display 504, via the network 130 or directly. It will be appreciated that the content may be communicated unidirectionally and/or bidirectionally to and from any one of the components in the system 500 and a content provider via the network 130. Examples of content may include any media information including, for example, video, music, medical and gaming information, and so forth.

The content services device(s) 506 may receive content such as cable television programming including media information, digital information, or other content. Examples of content providers may include any cable or satellite television or radio or Internet content providers, among others.

In some embodiments, the platform 502 receives control signals from the navigation controller 510, which includes one or more navigation features. The navigation features of the navigation controller 510 may be used to interact with the user interface 518, for example. The navigation controller 510 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures. Physical gestures include but are not limited to facial expressions, facial movements, movement of various limbs, body movements, body language or any combinations thereof. Such physical gestures can be recognized and translated into commands or instructions.

Movements of the navigation features of the navigation controller 510 may be echoed on the display 504 by movements of a pointer, cursor, focus ring, or other visual indicators displayed on the display 504. For example, under the control of the software 128, the navigation features located on the navigation controller 510 may be mapped to virtual navigation features displayed on the user interface 518. In some embodiments, the navigation controller 510 may not be a separate component but, rather, may be integrated into the platform 502 and/or the display 504.

The system 500 may include drivers (not shown) that include technology to enable users to instantly turn on and off the platform 502 with the touch of a button after initial boot-up, when enabled, for example. Program logic may allow the platform 502 to stream content to media adaptors or other content services device(s) 506 or content delivery device(s) 508 when the platform is turned "off." In addition, the chipset 512 may include hardware and/or software support for 5.1 surround sound audio and/or high definition 7.1 surround sound audio, for example. The drivers may include a graphics driver for integrated graphics platforms. In some embodiments, the graphics driver includes a peripheral component interconnect express (PCIe) graphics card.

In various embodiments, any one or more of the components shown in the system 500 may be integrated. For example, the platform 502 and the content services device(s) 506 may be integrated; the platform 502 and the content delivery device(s) 508 may be integrated; or the platform 502, the content services device(s) 506, and the content delivery device(s) 508 may be integrated. In some embodiments, the platform 502 and the display 504 are an integrated unit. The display 504 and the content service device(s) 506 may be integrated, or the display 504 and the content delivery device(s) 508 may be integrated, for example.

The system 500 may be implemented as a wireless system or a wired system. When implemented as a wireless system, the system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum. When implemented as a wired system, the system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, or the like. Examples of wired communications media may include a wire, cable, metal leads, printed circuit board (PCB), backplane, switch fabric, semiconductor material, twisted-pair wire, co-axial cable, fiber optics, or the like.

The platform 502 may establish one or more logical or physical channels to communicate information. The information may include media information and control information. Media information may refer to any data representing content meant for a user. Examples of content may include, for example, data from a voice conversation, videoconference, streaming video, electronic mail (email) message, voice mail message, alphanumeric symbols, graphics, image, video, text, and the like. Data from a voice conversation may be, for example, speech information, silence periods, background noise, comfort noise, tones, and the like. Control information may refer to any data representing commands, instructions or control words meant for an automated system. For example, control information may be used to route media information through a system, or instruct a node to process the media information in a predetermined manner. The embodiments, however, are not limited to the elements or the context shown or described in FIG. 5.

Figure 6:
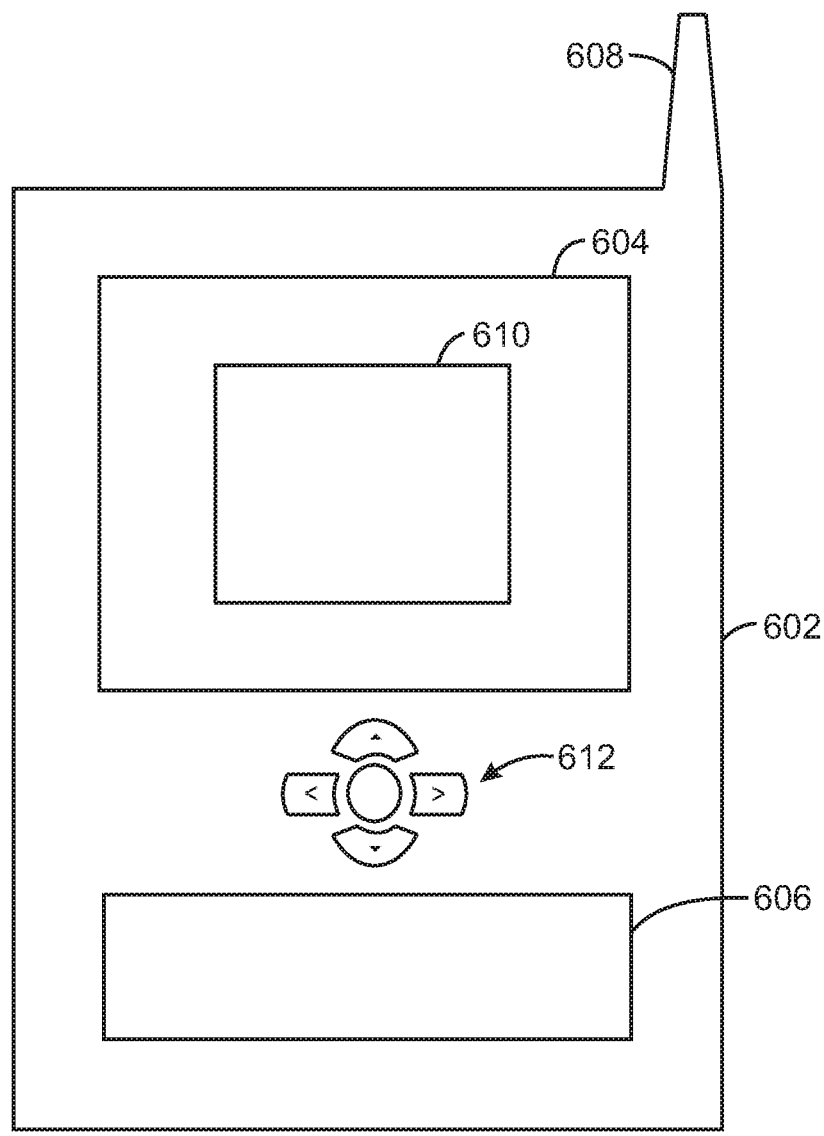
FIG. 6 is a schematic of a small form factor device in which the system of FIG. 5 may be embodied.

FIG. 6 is a schematic of a small form factor device 600 in which the system 500 of FIG. 5 may be embodied. Like numbered items are as described with respect to FIG. 6. In some embodiments, for example, the device 600 is implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like.

An example of a mobile computing device may also include a computer that is arranged to be worn by a person, such as a wrist computer, finger computer, ring computer, eyeglass computer, belt-clip computer, arm-band computer, shoe computer, clothing computer, or any other suitable type of wearable computer. For example, the mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well.

As shown in FIG. 6, the device 600 may include a housing 602, a display 604, an input/output (I/O) device 606, and an antenna 608. The device 600 may also include navigation features 610. The display 604 may include any suitable display unit for displaying information appropriate for a mobile computing device. The I/O device 606 may include any suitable I/O device for entering information into a mobile computing device. For example, the I/O device 606 may include an alphanumeric keyboard, a numeric keypad, a touch pad, input keys, buttons, switches, rocker switches, microphones, speakers, a voice recognition device and software, or the like. Information may also be entered into the device 600 by way of microphone. Such information may be digitized by a voice recognition device.

Figure 7:
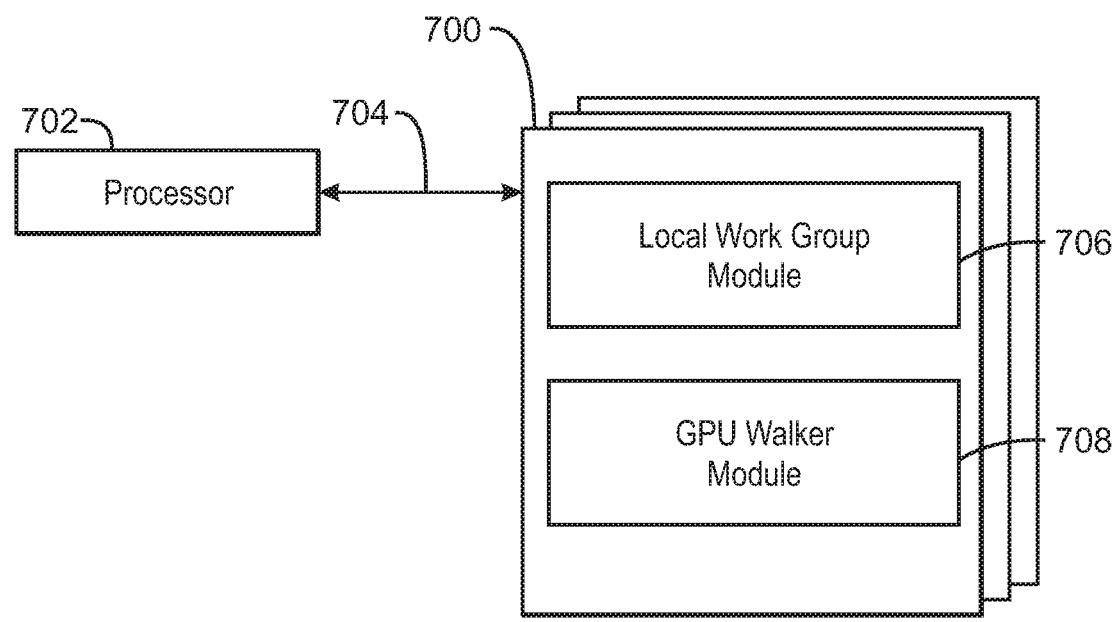
FIG. 7 is a block diagram showing tangible, non-transitory computer-readable media that stores code for scheduling and dispatch of a GPU workload, in accordance with embodiments.

FIG. 7 is a block diagram showing tangible, non-transitory computer-readable media 700 that stores code for scheduling and dispatch of a GPU workload, in accordance with embodiments. The tangible, non-transitory computer-readable media 700 may be accessed by a processor 702 over a computer bus 704. Furthermore, the tangible, non-transitory computer-readable media 700 may include code configured to direct the processor 702 to perform the techniques described herein.

The various software components discussed herein may be stored on the tangible, non-transitory computer-readable media 700, as indicated in FIG. 7. For example, a local work group module 706 may be configured to select a desired local work group size. In some embodiments, a desired local work group size is determined as described in FIG. 2. A GPU walker module 708 may be configured to iteratively modify a number of dimensions of the local work group size such that a number of dimensions of a global work group size are divisible by the dimensions of the local work group size. In some embodiments, the GPU walker module splits a GPU walker command into a main walker, a right-edge walker, a bottom-edge walker, and a right-bottom edge walker.

The block diagram of FIG. 7 is not intended to indicate that the tangible, non-transitory computer-readable media 700 are to include all of the components shown in FIG. 7. Further, the tangible, non-transitory computer-readable media 700 may include any number of additional components not shown in FIG. 7, depending on the details of the specific implementation.

Example 1

A method for scheduling and dispatching workloads is described herein. The method includes selecting a local work group size of a graphics processing unit workload, and dispatching threads of the graphics processing unit workload by splitting a graphics processing unit walker command.

The local work group size can be selected such that a number of wasted SIMD channels for a local work group is minimized. The local work group size can also be selected such that a number of barriers used for a global work space is minimized. Further, the local work group size can be selected such that the use of a shared local memory is maximized. A shared local memory may be tiled. The graphics processing unit walker command is may be a hardware command used to dispatch threads. Further, the graphics processing unit walker command may include a mask, and the mask is used to disable channels of an SIMD execution unit. A local work group size may be a ratio of a global work space size. Further, the method may be performed using OpenCL or DirectX.

Example 2

A split graphics processing unit walker command is described herein. The split graphics processing unit walker command includes a hardware thread generation mechanism. The hardware thread generation mechanism dispatches threads associated with work items in a global work space, wherein the thread generation mechanism is split in order to dispatch threads from a plurality of graphics processing unit walker commands.

A desired local work group size within the global work group size may be determined before executing the split graphics processing unit walker command. A desired local work group size may be obtained, and the dimensions of the desired local work group size can be modified such that the global work group size is a multiple of the modified desired local work group size. The split graphics processing unit walker command may include a main walker, a right-edge walker, a bottom-edge walker, and a right-bottom edge walker. Further, a desired local work group size within the global work group size can include a plurality of work items, each work item identified by a local identification and a global identification.

Example 3

A system that schedules and dispatches graphics processing unit workloads is described herein. The system includes a display, a radio, and a memory that is to store instructions and that is communicatively coupled to the display. The system also includes a processor communicatively coupled to the radio and the memory. When the processor is to execute the instructions, the processor is to determine a desired local work group size of a graphics processing unit workload, and dispatch threads of the graphics processing unit workload by splitting a graphics processing unit walker command. The desired local work group size may be selected such that a number of wasted SIMD channels for a desired local work group is minimized. The processor may be an n-channel SIMD processing unit. Additionally, the processor may be a graphics processing unit. The graphics processing unit walker command can be a hardware command used to dispatch threads.

Example 4

A tangible, non-transitory, computer-readable medium is described herein. The tangible, non-transitory, computer-readable medium includes code to direct a processor to select a desired local work group size and iteratively modify a number of dimensions of the local work group size such that a number of dimensions of a global work group size are divisible by the dimensions of the local work group size.

The dimensions of the local work group size can be selected such that a number of wasted SIMD channels for a local work group is minimized. The local work group size can also be selected such that a number of barriers used for a global work space is minimized. Moreover, the local work group size may be selected such that the use of a shared local memory is maximized. A graphics processing unit walker command can dispatch threads based on the local work group size. Additionally, the dimensions of the local work group size are a ratio of the dimensions of the global work group size.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. An apparatus comprising:
one or more processors to:
select a local work group size of threads for processing a workload, wherein the local work group size is based on dimensional needs of an application such that waste of parallel computing channels is minimized while residency is maximized; and
dispatch the threads for processing of the workload by splitting a command, wherein the command includes a nested loop of multiple levels having inner levels corresponding to the local work group size, and outer levels corresponding to a global work space size.

2. The apparatus of claim 1, wherein the one or more processors comprise a graphics processing unit, wherein the workload includes a graphics processing unit workload, and wherein the command includes a graphics processing unit command, wherein the graphics processing unit is coupled to a central processing unit.

3. The apparatus of claim 1, wherein the parallel computing channels comprise single instruction, multiple data (SIMD) channels.

4. The apparatus of claim 1, wherein the local work group size is selected such that use of a shared local memory is maximized, wherein the shared local memory is tiled.

5. The apparatus of claim 1, wherein the command comprises a graphics processing walker command including a hardware command that is used to dispatch the threads.

6. The apparatus of claim 5, wherein the graphics processing walker command further includes a mask that is used to disable the SIMD channels of an SIMD execution unit, wherein the graphics processing walker command further includes one or more of a main walker command, a right-edge walker command, a bottom-edge walker command, and a right-bottom walker command.

7. A method comprising:
selecting, by one or more processors, a local work group size of threads for processing a workload, wherein the local work group size is based on dimensional needs of an application such that waste of parallel computing channels is minimized while residency is maximized; and
dispatching the threads for processing of the workload by splitting a command, wherein the command includes a nested loop of multiple levels having inner levels corresponding to the local work group size, and outer levels corresponding to a global work space size.

8. The method of claim 7, wherein the one or more processors comprise a graphics processing unit, wherein the workload includes a graphics processing unit workload, and wherein the command includes a graphics processing unit command, wherein the graphics processing unit is coupled to a central processing unit.

9. The method of claim 7, wherein the parallel computing channels comprise single instruction, multiple data (SIMD) channels.

10. The method of claim 7, wherein the local work group size is selected such that use of a shared local memory is maximized, wherein the shared local memory is tiled.

11. The method of claim 7, wherein the command comprises a graphics processing walker command including a hardware command that is used to dispatch the threads.

12. The method of claim 11, wherein the graphics processing walker command further includes a mask that is used to disable the SIMD channels of an SIMD execution unit, wherein the graphics processing walker command further includes one or more of a main walker command, a right-edge walker command, a bottom-edge walker command, and a right-bottom walker command.

13. At least one non-transitory machine-readable medium having stored thereon instructions which, when executed by one or more processors, cause the one or more processors to perform operations comprising:
selecting a local work group size of threads for processing a workload, wherein the local work group size is based on dimensional needs of an application such that waste of parallel computing channels is minimized while residency is maximized; and
dispatching the threads for processing of the workload by splitting a command, wherein the command includes a nested loop of multiple levels having inner levels corresponding to the local work group size, and outer levels corresponding to a global work space size.

14. The non-transitory machine-readable medium of claim 13, wherein the one or more processors comprise a graphics processing unit, wherein the workload includes a graphics processing unit workload, and wherein the command includes a graphics processing unit command, wherein the graphics processing unit is coupled to a central processing unit.

15. The non-transitory machine-readable medium of claim 13, wherein the parallel computing channels comprise single instruction, multiple data (SIMD) channels.

16. The non-transitory machine-readable medium of claim 13, wherein the local work group size is selected such that use of a shared local memory is maximized, wherein the shared local memory is tiled.

17. The non-transitory machine-readable medium of claim 13, wherein the command comprises a graphics processing walker command including a hardware command that is used to dispatch the threads.

18. The non-transitory machine-readable medium of claim 17, wherein the graphics processing walker command further includes a mask that is used to disable the SIMD channels of an SIMD execution unit, wherein the graphics processing walker command further includes one or more of a main walker command, a right-edge walker command, a bottom-edge walker command, and a right-bottom walker command.

19. A data processing system comprising:
a memory; and
one or more processors coupled to the memory, the one or more processors to:
select a local work group size of threads for processing a workload, wherein the local work group size is based on dimensional needs of an application such that waste of parallel computing channels is minimized while residency is maximized; and
dispatch the threads for processing of the workload by splitting a command, wherein the command includes a nested loop of multiple levels having inner levels corresponding to the local work group size, and outer levels corresponding to a global work space size.

20. The data processing system of claim 19, wherein the one or more processors comprise a graphics processing unit, wherein the workload includes a graphics processing unit workload, and wherein the command includes a graphics processing unit command, wherein the graphics processing unit is coupled to a central processing unit.

21. The data processing system of claim 19, wherein the parallel computing channels comprise single instruction, multiple data (SIMD) channels.

22. The data processing system of claim 19, wherein the local work group size is selected such that use of a shared local memory is maximized, wherein the shared local memory is tiled.

23. The data processing system of claim 19, wherein the command comprises a graphics processing walker command including a hardware command that is used to dispatch the threads.

24. The data processing system of claim 23, wherein the graphics processing walker command further includes a mask that is used to disable the SIMD channels of an SIMD execution unit, wherein the graphics processing walker command further includes one or more of a main walker command, a right-edge walker command, a bottom-edge walker command, and a right-bottom walker command.

\* \* \* \* \*